(12) United States Patent
Kojo et al.

(10) Patent No.: US 8,565,974 B2
(45) Date of Patent: Oct. 22, 2013

(54) CONTROL SYSTEM FOR VEHICLES FOR DECREASING CONTROLLING AMOUNT BY JUDGING ABNORMALITY

(75) Inventors: Takahiro Kojo, Gotenba (JP); Masato Suzumura, Susono (JP); Yoshiaki Tsuchiya, Nishikamo-gun (JP); Kenji Asano, Toyota (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 1544 days.

(21) Appl. No.: 10/594,750

(22) PCT Filed: Oct. 18, 2005

(86) PCT No.: PCT/JP2005/019460
§ 371 (c)(1),
(2), (4) Date: Sep. 29, 2006

(87) PCT Pub. No.: WO2006/043694
PCT Pub. Date: Apr. 27, 2006

(65) Prior Publication Data
US 2008/0097671 A1    Apr. 24, 2008

(30) Foreign Application Priority Data
Oct. 18, 2004   (JP) .................................. 2004-303024

(51) Int. Cl.
*A01B 69/00*   (2006.01)
*B62D 6/00*    (2006.01)
*B63G 8/20*    (2006.01)
*B63H 25/04*   (2006.01)
*G05D 1/00*    (2006.01)
*G06F 17/00*   (2006.01)

(52) U.S. Cl.
USPC ........ 701/41; 701/1; 701/42; 701/43; 701/44; 701/29.1; 701/30.5; 701/30.6; 701/31.1; 701/34.4

(58) Field of Classification Search
USPC .......... 701/1, 41, 42, 43, 44, 29.1, 30.5, 30.6, 701/31.1, 34.4
See application file for complete search history.

(56) References Cited

U.S. PATENT DOCUMENTS

| 4,509,611 | A | * | 4/1985 | Kade et al. .................... 180/446 |
| 4,624,334 | A | * | 11/1986 | Kelledes et al. .............. 180/446 |
| 4,674,587 | A | * | 6/1987 | Suzuki et al. ................. 180/422 |
| 4,794,997 | A | * | 1/1989 | North ............................ 180/446 |

(Continued)

FOREIGN PATENT DOCUMENTS

| EP | 1 120 805 | 8/2001 |
| EP | 1188640 A2 | 3/2002 |

(Continued)

*Primary Examiner* — Bhavesh V Amin
(74) *Attorney, Agent, or Firm* — Oliff and Berridge, PLC

(57) ABSTRACT

In view of the matter that an abnormality occurred in an operating portion of a control system comes out in an early stage as a result of the control, while it takes a time for an abnormality occurred in the generation of a controlling amount for controlling the operation of an operating portion to come out, in ceasing the control when an abnormality has occurred in the control system the controlling amount is decreased at a higher speed when the abnormality of the controlling amount was judged than a speed at which the operation of the operating device is decreased when the abnormality of the operating device was judged.

6 Claims, 3 Drawing Sheets

(56) References Cited

U.S. PATENT DOCUMENTS

| | | | |
|---|---|---|---|
| 4,887,682 A * | 12/1989 | Drutchas et al. | 180/446 |
| 5,053,966 A * | 10/1991 | Takahashi et al. | 701/41 |
| 5,259,473 A * | 11/1993 | Nishimoto | 180/446 |
| 5,498,072 A * | 3/1996 | Shimizu | 303/191 |
| 5,809,444 A * | 9/1998 | Hadeler et al. | 701/72 |
| 5,857,160 A * | 1/1999 | Dickinson et al. | 701/41 |
| 5,881,836 A * | 3/1999 | Nishimoto et al. | 180/446 |
| 6,032,091 A | 2/2000 | Noro et al. | |
| 6,077,190 A * | 6/2000 | Tabata et al. | 477/97 |
| 6,295,490 B1 | 9/2001 | Streib | |
| 6,389,338 B1 * | 5/2002 | Chandy et al. | 701/33.9 |
| 6,401,019 B2 * | 6/2002 | Ikemoto | 701/41 |
| 6,609,052 B2 * | 8/2003 | Radamis et al. | 701/41 |
| 6,640,167 B1 * | 10/2003 | Carroll et al. | 701/29.2 |
| 6,658,333 B2 * | 12/2003 | Kawada et al. | 701/41 |
| 7,630,807 B2 * | 12/2009 | Yoshimura et al. | 701/48 |
| 2001/0002631 A1 * | 6/2001 | Okanoue et al. | 180/446 |
| 2001/0016793 A1 * | 8/2001 | Ikemoto | 701/41 |
| 2002/0036477 A1 | 3/2002 | Baumgarten | |
| 2007/0294009 A1 * | 12/2007 | Yasui et al. | 701/41 |
| 2008/0097671 A1 * | 4/2008 | Kojo et al. | 701/43 |

FOREIGN PATENT DOCUMENTS

| | | |
|---|---|---|
| JP | A 4-252775 | 9/1992 |
| JP | A 5-254454 | 10/1993 |
| JP | A 6-305439 | 11/1994 |
| JP | A 7-81590 | 3/1995 |
| JP | A 11-34892 | 2/1999 |
| JP | A 11-208492 | 8/1999 |
| JP | A 2001-206236 | 7/2001 |
| NL | DE 199 43 960 A1 | 3/2001 |

* cited by examiner

CONTROL SYSTEM FOR VEHICLES FOR DECREASING CONTROLLING AMOUNT BY JUDGING ABNORMALITY

FIELD OF THE INVENTION

The present invention relates to judging and dealing with abnormalities of an operating device and a controlling amount for controlling the operating device in a control system of a vehicle having the operating device for operating a member for adjusting a behavior of the vehicle and a calculating device for calculating the controlling amount.

BACKGROUND OF THE INVENTION

As one of the arts for dealing with an abnormality occurred in the control system of a vehicle such as an automobile or the like, it is described in Japanese Patent Laid-open Publication Hei 11-208492 to decrease a steering assisting force when an abnormality has occurred therein such that the steering assisting force is not appropriately controlled.

DISCLOSURE OF THE INVENTION

It is generally appropriate to gradually cease the control at a certain slowness than to immediately cease the control when an abnormality has occurred in a control system. However, an abnormality occurred in an operating portion comes out in an early stage as the result of the control, while when an abnormality has occurred in the generation of a controlling amount for controlling the operation of an operating portion, it takes a time to judge the abnormality. In view of this, it is considered to take different measures against the abnormality of an operating portion and the abnormality of a controlling amount.

In view of the above-mentioned situation in the control systems, it is a principal object of the present invention to provide a control system for appropriately dealing with an abnormality of an operating portion and an abnormality of a controlling amount with regard to ceasing the operation of the control system, particularly in the behavior control of vehicles in which the timing of dealing with the abnormality of the control system is important.

In order to accomplish the above-mentioned object, the present invention proposes a control system comprising an operating device for operating a member for adjusting a behavior of a vehicle, and a calculating device for calculating a controlling amount for controlling the operation of the operating device, characterized by judging an abnormality of the operating device and an abnormality of the controlling amount, and decreasing the controlling amount at a higher speed when the abnormality of the controlling amount was judged than a speed at which the operation of the operating device is decreased when the abnormality of the operating device was judged.

When an abnormality of an operating device for operating a member for adjusting a behavior of a vehicle and an abnormality of a calculating device for calculating the controlling amount for controlling an operation of the operating device are separately judged in a control system, particularly a control system for controlling a behavior of a vehicle as described above, so that the operation of the control system is ceased by decreasing the operation of the operating device when the abnormality of the operating device has occurred, while the operation of the control system is ceased by decreasing the controlling amount when the abnormality of the controlling amount was judged, with such an arrangement that the speed of decreasing the controlling amount is higher than the speed of decreasing the operation of the operating device, the manner of ceasing the operation of the control system is properly set to comply with the different delay times in the coming out of the results of the control by the abnormality occurred in the operating device and the abnormality occurred in the controlling amount for controlling the operation of the operating device.

In the above mentioned control system, the calculating device may comprise first and second calculating portions for calculating the controlling amount, so as to judge the abnormality of the controlling amount by comparing the controlling amounts by the first and second calculating portions with one another. By such an arrangement, the abnormality occurred in the controlling amount can be precisely judged.

In that case, even when it was judged that the abnormality has occurred in either of the controlling amounts calculated by the first and second calculating portions, the control of the operation of the operating device may be carried out thereafter by decreasing the controlling amount which has been used up to the time in the control of the operation of the operating device. By such an arrangement, the abnormality of the controlling amount can be judged by only comparing the controlling amounts calculated by the first and second calculating portions with one another to see if there is any difference therebetween beyond a determined criterion, without requiring a judgment for which of the two controlling amounts is abnormal, so that the abnormality judgment is made easier.

Alternatively, however, when it is judged which of the controlling amounts calculated by the first and second calculating portions is abnormal, thereafter the operation of the operating device may be controlled by using the controlling amount judged not to be abnormal so that the normal controlling amount is decreased. In this case, although the judging operation will become a little more complicated because an evaluation of the abnormality is required in judging the abnormality of the controlling amounts, the subsequent process of ceasing the control by decreasing the controlling amount is more appropriately carried out in spite of the occurrence of the abnormality of the controlling amount.

In the above mentioned control system, the abnormality judgment of the controlling amount may be carried out when the operating device is not judged to be abnormal. By such an arrangement, the abnormality judgment of the controlling amount is available at a higher accuracy.

Further, in any event, in the above mentioned control system, the operating device may be a steering angle adjusting device for adjusting a steering angle of steered wheels relative to a steering amount by a steering wheel, and the decrease of the controlling amount and the operation of the operating device may be to decrease the steering adjusting amount of the steered wheels to 0.

BRIEF DESCRIPTION OF THE DRAWINGS

In the accompanying drawings.

BEST MODE EMBODIMENTS OF THE INVENTION

In the following, the present invention will be described in more detail in the form of some preferred embodiments thereof with reference to the accompanying drawings.

Figure 1:
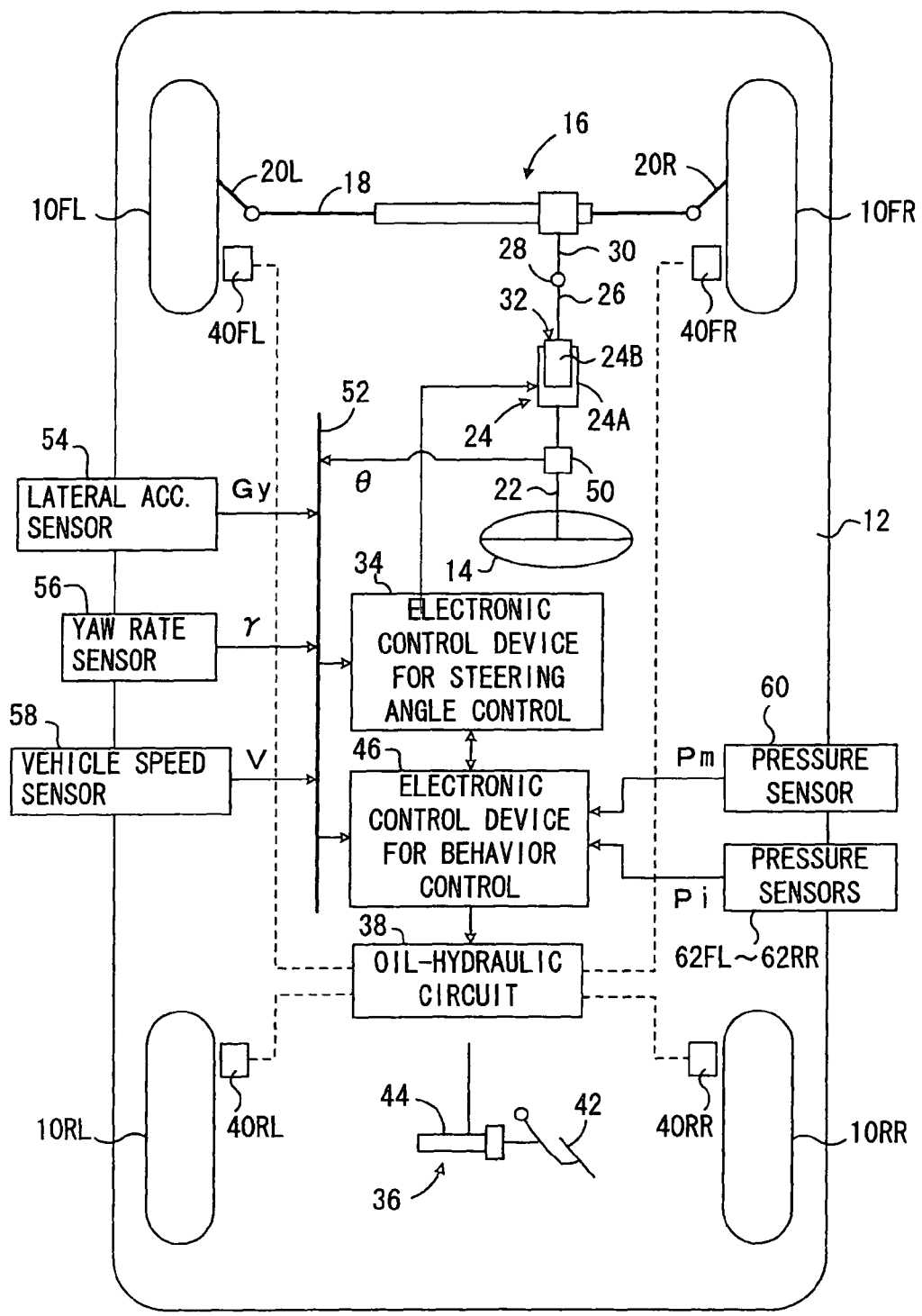
FIG. 1 is a diagrammatical view of a vehicle showing the essential portions thereof related with the control system according to the present intention.

In FIG. 1, 10FL and 10FR are front left and front right wheels, respectively, which are non-driven steered wheels. 10RL and 10RR are rear left and rear right wheels, respectively, which are driven by a power source not shown in the figure. These wheels are respectively suspended to a vehicle body 12 by wheel suspension devices not shown in the figure. The steered front left and front right wheels 10FL and 10FR are steered by a rack-and-pinion type power steering device 16 by way of a rack bar 18 and tie rods 20L and 20R in accordance with an operation of a steering wheel 14.

The steering wheel 14 is connected with a pinion shaft 30 of the power steering device 16 by way of an upper steering shaft 22, a steering angle adjusting device 24, a lower steering shaft 26 and a universal joint 28. The steering angle adjusting device 24 is connected with a lower end of the upper steering shaft 22 on the side of a housing 24A, and includes an electric motor 32 for an auxiliary steering as connected with an upper end of the lower steering shaft 26 on the side of a rotor 24B, so that when the lower steering shaft 26 is rotated relative to the upper steering shaft 22 by the steering angle adjusting device 24, the ratio of the steering angle of the steered front left and front right wheels 10FL and 10FR relative to the rotational angle of the steering wheel 14, i.e., the steering gear ratio, is variably adjusted for the purpose of a behavior control by steering the front left and front right wheels 10FL and 10FR relative to the steering wheel 14.

Figure 2:
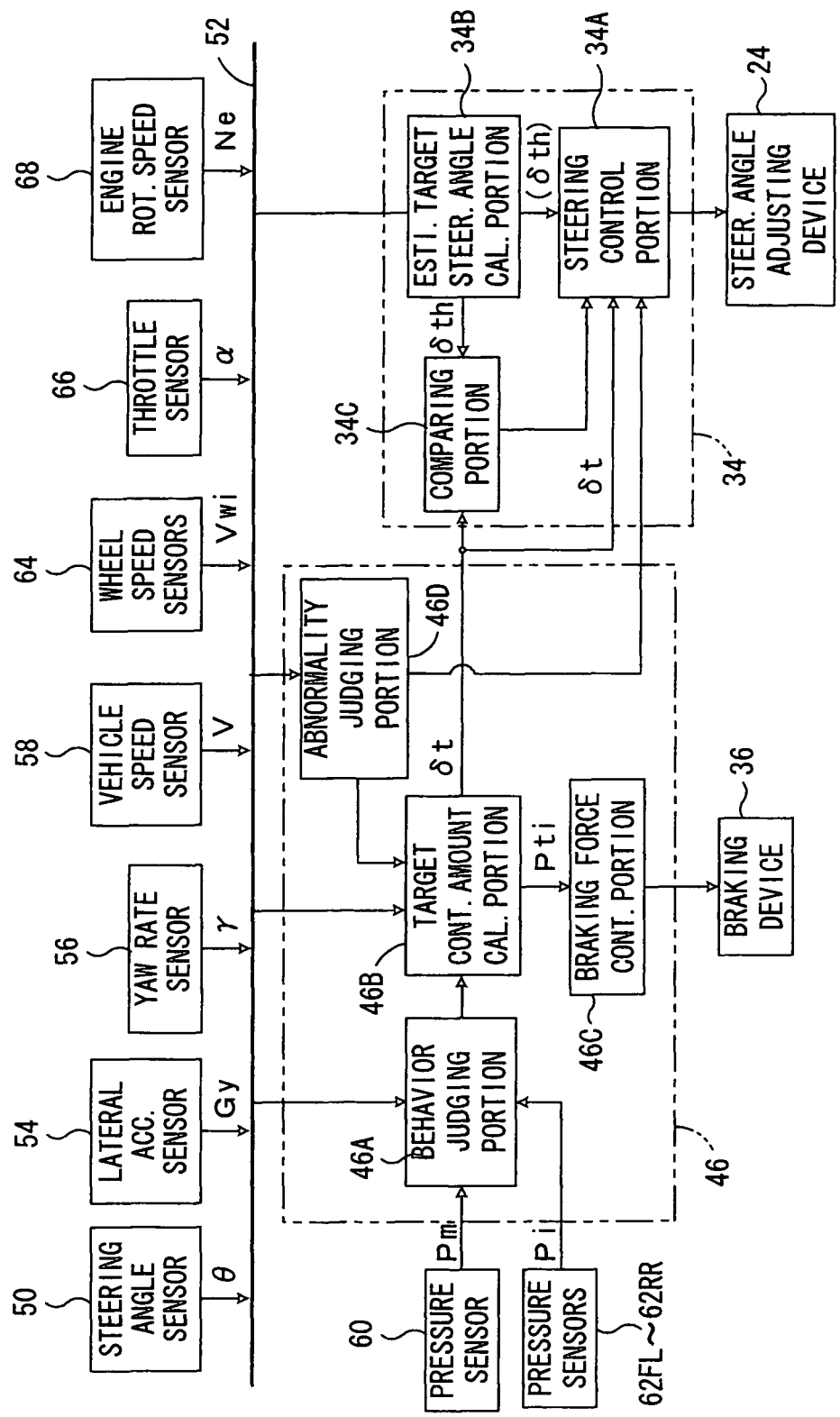
FIG. 2 is a block diagram of the system for executing controls in the control system and FIG. 3 is a flowchart showing the operation of the control system according to the present invention.

The steering angle adjusting device 24 is controlled by an electric control device 34 for steering angle control including a microcalculater, particularly by a steering angle control portion 34A shown in FIG. 2.

In this connection, when an abnormality has occurred such that the lower steering shaft 26 is not rotated relative to the upper steering shaft 22, a locking device not shown in FIG. 1 operates so that the relative rotation between the housing 24A and the rotor 24B is prohibited, so that the upper steering shaft 22 and the lower steering shaft 26 are bound together not to rotate relative to one another.

Although the power steering device 16 may be of an oil-hydraulic type or an electric type, it is desirable that it is an electric type power steering device of a common shaft type having a screw type conversion mechanism for converting the rotational motion of the electric motor to a reciprocal motion of the rack bar 18, so that a reaction torque generated by the auxiliary steering action of the steering adjusting device 24 and transmitted to the steering wheel 14 is decreased.

The braking forces of the respective wheels are controlled by the pressures Pi (i=FL, FR, RL, RR) in respective wheel cylinders 40FL, 40FR, 40RL and 40RR being controlled by an oil-hydraulic circuit 38. Although not shown in the figure, the oil-hydraulic circuit 38 may be of a type well-known in this art, including an oil reservoir, an oil pump and various valves, etc., and is adapted to control the pressures in the respective wheel cylinders normally according to the depression of a brake pedal 42 by a driver, while, when required, to separately control the pressures of the respective wheel cylinders according to the instructions of an electronic control device 46 for behavior control including a microcalculater as described herein below.

A steering angle sense 50 is provided at the upper steering shaft 22 for detecting the steering angle θ, and as shown in FIG. 2, the electronic control device 34 for steering angle control and the electronic control device 46 for behavior control are supplied with a signal indicating the steering angle θ detected by the steering angle since 50, a signal indicating lateral acceleration Gy detected by a lateral acceleration sensor 54, a signal indicating yaw rate γ detected by a yaw rate sensor 56, a signal indicating vehicle speed V detected by a vehicle speed sensor 58, signals indicating rotational speeds Vwi of the respective wheels detected by wheel speed sensors 64, a signal indicating throttle opening α of the engine detected by a throttle sensor 66 and a signal indicating rotational speed Ne of the engine detected by an engine rotational speed sensor 68 through a vehicle information infrastructure 52, while the electronic control device 46 is also supplied with a signal indicating master cylinder pressure Pm detected by a pressure sensor 60 and signals indicating pressures Pi of the respective wheel cylinders detected by pressure sensors 62FL-62RR.

In this connection, the steering angle sensor 50, the lateral acceleration sensor 54 and the yaw rate sensor 56 detect the steering angle θ, the lateral acceleration Gy and the yaw rate γ to be positive when the vehicle is making a left turn and to be negative when the vehicle is making a right turn.

As shown in FIG. 2, the electronic control device 46 for behavior control has a behavior judging portion 46A which judges the behavior of the vehicle for generating a spin quantity SS indicating the tendency of the vehicle to spin or a drift-out quantity DD indicating the tendency of the vehicle to drift out based upon running conditions of the vehicle such as the lateral acceleration Gy of the vehicle changing according to the running conditions of the vehicle, and a target controlling amount calculating portion 46B which calculates a target yaw moment Mt and a target deceleration Gxbt of the vehicle based upon the spin quantity SS and the drift-out quantity DD for stabilizing the behavior of the vehicle in a manner known in various forms in the automobile technique. The target controlling amount calculating portion 46B divides the target yaw moment Mt into at target yaw moment Mts by the steering angle control of the front left and front right wheels and a target yaw moment Mtb by the control of the braking force at a determined ratio, thereby calculating a target steering angle δt for the front left and front right wheels based upon the target yaw moment Mts to be output toward the steering angle controlling electronic control device 34, while calculating target braking pressures Pti of the respective wheels based upon the target deceleration Gxbt and the target yaw moment Mtb to be output toward a braking force controlling portion 46C so as to control the braking pressures Pi of the respective wheels to the corresponding target braking pressures Pti.

The electronic control device 46 further comprises an abnormality judging portion 46D for judging if an abnormality has occurred such that the steering angle of the front left and front right wheels is not properly controlled by the steering angle adjusting device 24 based upon a comparison of the target steering angle δt and the signal from the steering angle sensor 50, and when it was judged that such an abnormality has occurred, dispatches a signal showing it toward the target controlling amount calculating portion 46B and a steering control portion 34A, so as to let the steering angle adjusting device 24 cease the control by decreasing the target steering angle at a relatively moderate speed, while maintaining its operation for a while until the decreasing is completed.

The electronic control device 34 for steering angle control has the steering angle controlling portion 34A for controlling the steering angle adjusting device 24 based upon the target steering angle δt supplied from the behavior control electronic control device 46, and also an estimated steering angle calculating portion 34B for calculating an estimated target steering angle δth for the front left and front right wheels based upon the signals from the steering angle sensor 50, lateral acceleration sensor 54, yaw rate sensor 56, vehicle speed sensor 58, etc., and a comparing portion 34C for comparing the target steering angle δt for the front left and front right wheels input from the behavior controlling electronic control device 46 with the estimated target steering angle δth to judge if either of δt and δth is abnormal when the difference therebetween exceeds a standard value or further to judge which of δt and δth is abnormal in the light of the information available from the above-mentioned various sensors.

The comparing portion 34C normally lets the steering control portion 34A control the operation of the steering angle adjusting device 24 based upon the target steering angle δt calculated by the target steering amount calculating portion 46B, but when it has judged that either of δt and δth is abnormal, or further particularly which of δt or δth is abnormal, it acts on the steering control device 34A so as to let the steering angle adjusting device 24 continue to operate according to δt as it is supplied from the target controlling amount calculating portion 46B, or by replacing δt by δth when it was judged that δt is abnormal, but by decreasing δt or δth at a relatively high speed, so as to cease the control operation of the steering angle adjusting device 24 when the target steering angle has got to zero.

In other words, when it was judged that δt or δth is abnormal, even when the abnormal δt is used as it is or when the abnormal δt is replaced by δth, the target steering angle is decreased at a speed higher than that when an abnormality has occurred in the steering angle adjusting device 24.

In this connection, the vehicle running control itself for the behavior control of the vehicle including the spin suppress control and the drift-out suppress control by the control of the steering angle and the braking force does not form the gist of the present invention, and may be carried out in any manner known in this art.

Figure 3:
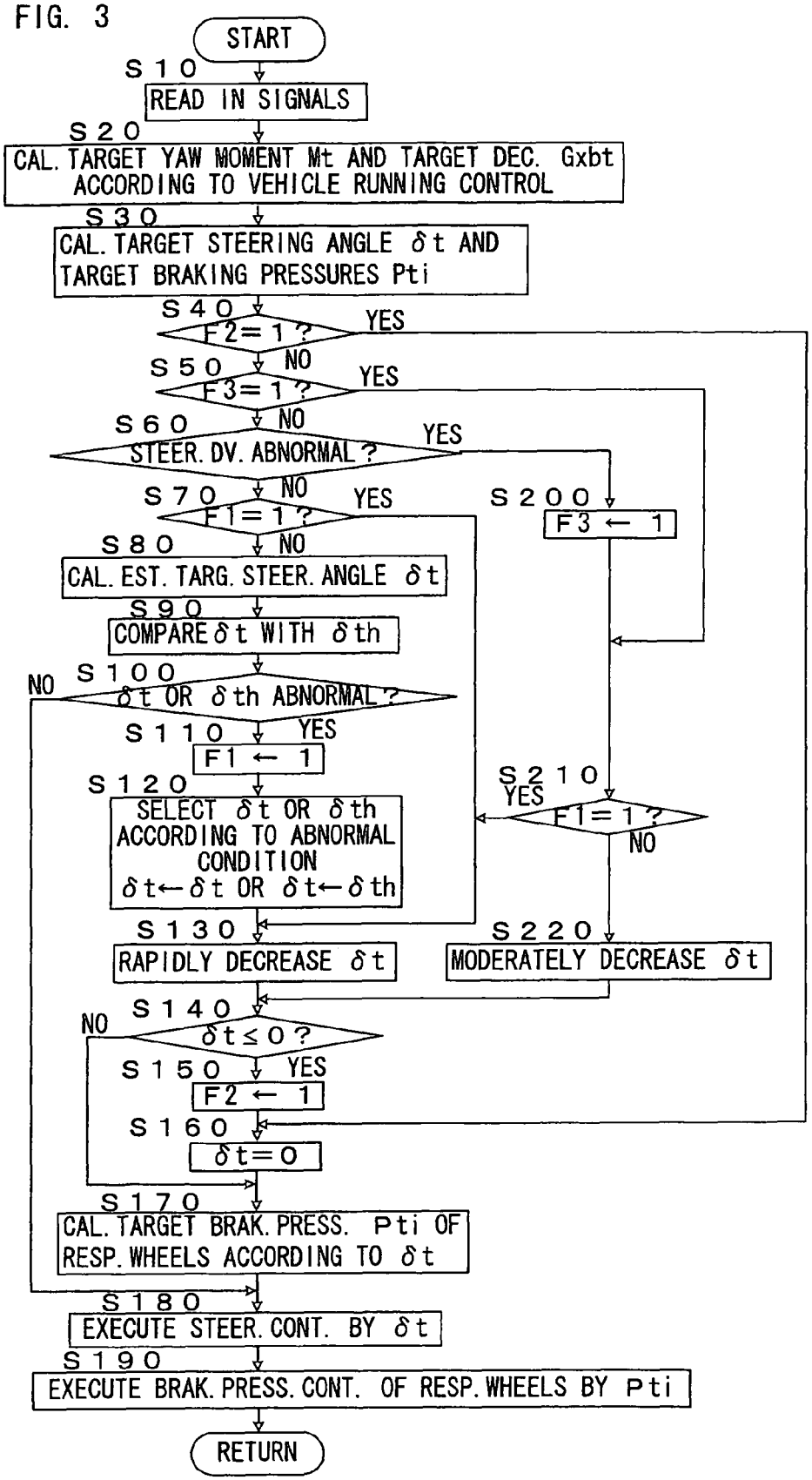

Next, by referring to the flowchart shown in FIG. 3, the operation of the control system according to the present invention will be described with the respect to the control routine of the behavior control of the vehicle. The control according to such a flowchart may be started by the closing of an ignition switch not shown in the figure and cyclically repeated at a cycle time of the order of 10-100 milliseconds.

When the control is started, in step 10 the signals from the above-mentioned various sensors are read in.

Then, the control proceeds to step 20, and the target yaw moment Mt and the target deceleration Gxbt are calculated according to an optional running control of the vehicle known in this art. Then, in step 30 the target steering angle δt (target value for the steering angle for adjusting the steering angle of the steered wheels relative to the steering angle by the steering wheel for the behavior control of the vehicle) and the target braking pressures Pti of the respective wheels are calculated.

Then, the control proceeds to step 40, and it is judged if a flag F2 is 1 or not. The flag F2 is reset to 0 at the time of starting the control and is set to 1 when the control reached the below-mentioned step 150, and therefore, up to that time the answer of step 40 is no, and for the time being the control proceeds to step 50.

In step 50 it is just if a flag F3 is 1 or not. The flag F3 is also reset to 0 at the time of starting the control and is set to 1 when the control reached the below-mentioned step 200, and therefore, up to that time the answer of step 50 is no, and for the time being the control proceeds to step 60.

In step 60, it is judged if the steering device like the steering angle adjusting device 24 is abnormal or not. This judgment may be made by an existence of such a difference between the target steering angle δt and the steering angle detected by the steering angle sensor 50 that is too large even in consideration of a transitional delay of the control based upon the conditions of the steering control. When there is no abnormality in the steering device, so that the answer of step 60 is no, the control proceeds to step 70.

In step 70, it is judged if a flag F1 is 1 or not. The flag 1 is also reset to 0 at the time of starting the control and set to 1 when the control reached the below-mentioned step 110, and therefore, up to that time the answer of step 70 is no, and for the time being the control proceeds to step 80.

In step 80, the estimated target steering angle δth for the front left and front right wheels is calculated by the estimated target steering angle calculating portion 34B of the steering angle controlling electronic control device 34 based upon the signals from the steering angle sensor 50, lateral acceleration sensor 54, yaw rate sensor 56, vehicle speed sensor 58, etc.

Then, the control proceeds to step 90, and the target steering angle δt is compared with the estimated target steering angle δth by the comparing portion 34C of the steering angle controlling electronic control device 34, and then in step 100 it is judged if either of δt and δth is abnormal. When there is no difference exceeding a determined value between δt and δth so that there is no abnormality in any of δt and δth, so that the answer of step 100 is no, the control proceeds to step 180, whereas when it was judged that there is an abnormality by the difference between δt and δth exceeding a determined value, the control proceeds to step 110, wherein the flag F1 is set to 1, and then the control proceeds to step 120.

In step 120, the abnormality with regard to δt or δth is judged in reference of the output signals of several sensors, and by guessing which of δt and δth is abnormal, δt or δth which is not guessed to be abnormal is selected as the target steering angle to be the object for the decreasing control in the following processing. However, step 120 may be omitted, and regardless which of δt and δth is abnormal, δt calculated in the target controlling amount calculating portion 46B may be made the target steering angle to be the object for the decreasing control in the following processing.

Then, the control proceeds to step 130, and the target steering angle δt is decreased at a relatively high speed, or rapidly, each time when the control reaches this step. This rapid decreasing operation may be made by the steering control portion 34A. Thereafter, the control proceeds to step 140. In this connection, when the flag F1 was set to 1, the next and subsequent controls proceed from step 70 to step 130 by bypassing steps 80-120, as long as the steering system remains normal, to swiftly decrease δt.

Then, in step 140, it is judged if δt has reached 0 or not. While the answer is no, the control proceeds to step 170, bypassing steps 150 and 160, and the target braking pressures Pti of the respective wheels are modified so as to accomplish the target yaw moment Mt and the target deceleration Gxbt calculated in step 20 in relation to the decreasing δt.

Then, in step 180, the steering control is executed according to the value of decreasing δt, and further in step 190 the braking pressure control of the respective wheels are executed according to the target braking pressures Pti which were modified in step 170 or as calculated in step 30 when there is no abnormality in the target steering angle and the control has come to this step without passing step 170.

When the decreasing of the target steering angle δt in step 130 has ended so that δt becomes 0, the answer of step 140 turns into yes, then the control proceeds to step 150, and the flag F2 is set to 1, and then in step 160 δt is made 0. After the flag F2 was set to 1, the control proceeds from step 40 directly to step 160, and the braking pressure control is carried out for the respective wheels according to the target braking pressures Pti while keeping δt at 0.

On the other hand, when an abnormality has occurred in the steering device and the answer in step 60 becomes yes, then the control proceeds to step 200, and after the flag F3 was set to 1 here, the control further proceeds to step 210, and it is judged if the flag F1 is 1 or not. When an abnormality has occurred in the steering device but no abnormality has occurred in the calculation of the target steering angle δt, the flag F1 remains 0, and therefore the answer of step 210 is no, and then the control proceeds to step 220, and in this case the target steering angle δt is decreased at a relatively moderate speed. When the answer of step 60 has once become yes, since the flag F3 is set to 1, thereafter the control proceeds from step 50 to step 210 while bypassing steps 60 and 200.

When first there is no abnormality in the steering device and there is an abnormality in the calculation of the target steering angle δt, the control proceeds to step 110, and the flag F1 is set to 1, and therefore, if an abnormality occurs in the steering device during the rapid decreasing of δt, so that the answer of step 60 turns from no to yes, since the answer of step 210 is yes, in this case the control proceeds to step 130, and the decreasing of δt at the high speed is continued.

From the foregoing it will be understood that when an abnormality has occurred in an operating device such as the steering angle adjusting device 24 in the behavior control of the vehicle, the control is ceased by decreasing the controlling amount at a relatively moderate speed most properly adjusted to the speed at which the abnormality comes out in the results of control, while when an abnormality has occurred in the controlling amount by an abnormality of a calculating portion such as the target controlling amount calculating portion 46B or the estimated target steering angle calculating portion 34B provided for checking an abnormality of the target controlling amount calculating portion 46B, the control is ceased at a relatively high speed to meet with the matter that a substantial time has already lapsed when the abnormality came out to be judged.

Although the invention has been described in detail in the above with respect to particular embodiments thereof, it will be apparent for those skilled in the art that various modifications are possible within the scope of the present invention.

The invention claimed is:

1. A control system comprising
    an operating device for operating a steering member for adjusting a steering behavior of a vehicle, and
    a calculating device for calculating a controlling amount for controlling the operation of the operating device, wherein the control system
    judges an abnormality of the operating device and separately judges an abnormality of the controlling amount, and
    decreases the controlling amount at a speed when the abnormality of the controlling amount was judged or when the abnormality of the operating device was judged, the speed of decreasing the controlling amount being higher when the abnormality of the controlling amount was judged than when the abnormality of the operating device was judged.

2. A control system according to claim 1, wherein the calculating device comprises a first calculating portion and a second calculating portion for calculating a first one of the controlling amount and a second one of the controlling amount, respectively, so as to judge the abnormality of the controlling amount by comparing the first one of the controlling amount and the second one of the controlling amount with one another.

3. A control system according to claim 2, wherein even when it was judged that the abnormality has occurred in either the first one of the controlling amount or the second one of the controlling amount, control of the operation of the operating device thereafter is carried out by decreasing the controlling amount which has been used up to the time in the control of the operation of the operating device.

4. A control system according to claim 2, wherein when it is judged that either of the first one of the controlling amount calculated by the first calculating portion or the second one of the controlling amount calculated by the second calculating portion is abnormal, thereafter the operation of the operating device is controlled by using the other of the first one of the controlling amount and the second one of the controlling amount that was judged not to be abnormal to decrease the controlling amount.

5. A control system according to claim 1, wherein the abnormality judging of the controlling amount is carried out when the operating device is not judged to be abnormal.

6. A control system according to claim 1, wherein the operating device is a steering angle adjusting device for adjusting a steering angle of steered wheels relative to a steering amount by a steering wheel, and the decrease of the controlling amount and the operation of the operating device is to decrease the steering adjusting amount of the steered wheels to 0.

* * * * *